(12) United States Patent
Kim

(10) Patent No.: US 12,459,475 B2
(45) Date of Patent: Nov. 4, 2025

(54) ELECTRONIC BRAKE SYSTEM

(71) Applicant: HL MANDO CORPORATION, Gyeonggi-do (KR)

(72) Inventor: Jin Seok Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 612 days.

(21) Appl. No.: 17/438,337

(22) PCT Filed: Mar. 11, 2020

(86) PCT No.: PCT/KR2020/003362
§ 371 (c)(1),
(2) Date: Sep. 10, 2021

(87) PCT Pub. No.: WO2020/184967
PCT Pub. Date: Sep. 17, 2020

(65) Prior Publication Data
US 2022/0176928 A1    Jun. 9, 2022

(30) Foreign Application Priority Data

Mar. 11, 2019    (KR) .................. 10-2019-0027280

(51) Int. Cl.
*B60T 8/94*         (2006.01)
*B60T 7/04*         (2006.01)
(Continued)

(52) U.S. Cl.
CPC .............. *B60T 8/94* (2013.01); *B60T 7/042* (2013.01); *B60T 8/326* (2013.01); *B60T 8/409* (2013.01);
(Continued)

(58) Field of Classification Search
CPC ........................... B60T 8/326; B60T 13/168
See application file for complete search history.

(56) References Cited

U.S. PATENT DOCUMENTS

2011/0254357 A1* 10/2011 Vollert ............... B60T 13/586
                                                                303/2
2015/0336551 A1* 11/2015 Okano ............... B60T 13/142
                                                                701/70
2016/0272178 A1*  9/2016 Feigel ................ B60T 8/4081

FOREIGN PATENT DOCUMENTS

DE    102013223861 A1 *  5/2015 ............ B60T 13/142
DE    102017222435 A1 *  7/2018
(Continued)

OTHER PUBLICATIONS

Office Action dated Mar. 16, 2023 for Korean Patent Application No. 10-2019-0027280 and its English translation from Global Dossier.

(Continued)

*Primary Examiner* — Melody M Burch
(74) *Attorney, Agent, or Firm* — WOMBLE BOND DICKINSON (US) LLP

(57) ABSTRACT

Provided is an electronic brake system. The electronic brake system according to an embodiment of the disclosure includes a reservoir configured to store a pressing medium; a master cylinder connected to a brake pedal; a pedal simulator connected to the master cylinder; a hydraulic pressure supply device configured to generate hydraulic pressure by operating a hydraulic piston by an electrical signal output corresponding to a displacement of the brake pedal; a hydraulic control unit comprising a first hydraulic circuit and a second hydraulic circuit, and configured to control hydraulic pressure transmitted to the first hydraulic circuit and the second hydraulic circuit, the first hydraulic (Continued)

circuit including a first wheel cylinder and a second wheel cylinder, the second hydraulic circuit including a third wheel cylinder and a fourth wheel cylinder.

15 Claims, 4 Drawing Sheets

(51) Int. Cl.
  *B60T 8/32* (2006.01)
  *B60T 8/40* (2006.01)
  *B60T 13/14* (2006.01)
  *B60T 13/16* (2006.01)
  *B60T 13/68* (2006.01)
  *B60T 13/74* (2006.01)

(52) U.S. Cl.
  CPC .......... *B60T 13/142* (2013.01); *B60T 13/148* (2013.01); *B60T 13/168* (2013.01); *B60T 13/686* (2013.01); *B60T 13/741* (2013.01); *B60T 13/745* (2013.01); *B60T 2270/402* (2013.01); *B60T 2270/404* (2013.01); *B60T 2270/82* (2013.01)

(56) References Cited

FOREIGN PATENT DOCUMENTS

| JP | 2002-019592 | 1/2002 | |
|---|---|---|---|
| KR | 10-2011-0101153 | 9/2011 | |
| KR | 10-2016-0002117 | 1/2016 | |
| KR | 10-2016-0088382 | 7/2016 | |
| KR | 10-2017-0046898 | 5/2017 | |
| KR | 10-2017-0076764 | 7/2017 | |
| KR | 10-2019-0016796 | 2/2019 | |
| WO | WO-2017152168 A1 * | 9/2017 | .............. B60T 7/042 |
| WO | WO-2019011858 A1 * | 1/2019 | ............ B60T 11/103 |

OTHER PUBLICATIONS

International Search Report for PCT/KR2020/003362 mailed on Jul. 15, 2020 (now published as WO 2020/184967) with English translation provided by the WIPO.

Written Opinion of the International Searching Authority for PCT/KR2020/003362 mailed on Jul. 15, 2020 (now published as WO 2020/184967) with English translation provided by Google Translate.

* cited by examiner

ELECTRONIC BRAKE SYSTEM

CROSS-REFERENCE TO RELATED APPLICATIONS

This application is the national stage of International Application No. PCT/KR2020/003362, filed on Mar. 11, 2020, which claims priority, under 35 U.S.C. 119 (a), to Korean Patent Application No. 10-2019-0027280 filed in the Korean Intellectual Property Office on Mar. 11, 2019, the disclosure of which is incorporated by reference herein in their entireties.

TECHNICAL FIELD

The disclosure relates to an electronic brake system, and more specifically, to an electronic brake system that generates braking force using an electrical signal corresponding to a displacement of a brake pedal.

BACKGROUND ART

A brake system for braking of a vehicle is essentially mounted to a vehicle, and a variety of systems have been recently proposed for safety of drivers and passengers.

In a conventional brake system, when a driver operates a brake pedal, hydraulic pressure for braking is supplied to wheel cylinders using a booster mechanically connected to the brake pedal. Due to the high market demand for various brake functions, however, an electronic brake system provided with a hydraulic pressure supply device has recently come into widespread use. Once a driver operates a brake pedal, the hydraulic pressure supply device of the electronic brake system senses a displacement of the brake pedal through a pedal displacement sensor, and receives an electrical signal indicating the driver's braking intention from the pedal displacement sensor, such that the hydraulic pressure required for braking is supplied to wheel cylinders.

In the electronic brake system described above, in a normal operation mode, the driver's brake pedal operation is provided as an electrical signal and the hydraulic pressure supply device electrically operates and is controlled based on the electrical signal to generate and transmit hydraulic pressure required for braking to the wheel cylinders. As described above, since the electronic brake system electrically operates and is controlled, complicated and various braking functions may be performed. However, when a technical malfunction occurs in application components, hydraulic pressure required for braking is not stably generated, which may threaten the safety of passengers.

Accordingly, when an element is broken or out of control, the electronic brake system enters a fallback mode which is an abnormal operation mode, and in this case, a driver's brake pedal operation is required to be directly linked to the wheel cylinders. That is, in the abnormal operation mode of the electronic brake system, when the driver applies a pedal effort to the brake pedal, hydraulic pressure required for braking is required to be immediately generated and transmitted directly to the wheel cylinders.

However, in a conventional electronic brake system, since braking of a vehicle depends entirely on a driver's pedal effort in the fallback mode, movement of the vehicle may become unstable. Also, an immediate response to a variety of driving situations may not be made, resulting in an increase in safety accidents.

DISCLOSURE

Technical Problem

Therefore, it is an aspect of the disclosure to provide an electronic brake system that may brake a vehicle stably and effectively in various driving situations.

It is an aspect of the disclosure to provide an electronic brake system whose performance and operational stability are improved.

It is an aspect of the disclosure to provide an electronic brake system for improving ease of assembly and productivity of a product, as well as reducing manufacturing costs.

It is an aspect of the disclosure to provide an electronic brake system for reducing the number of constituent components and reducing a size and weight of the electronic brake system.

According to an aspect of the disclosure, there is provided an electronic brake system, including: a reservoir configured to store a pressing medium; a master cylinder connected to a brake pedal; a pedal simulator connected to the master cylinder; a hydraulic pressure supply device configured to generate hydraulic pressure by operating a hydraulic piston by an electrical signal output corresponding to a displacement of the brake pedal; a hydraulic control unit including a first hydraulic circuit and a second hydraulic circuit, and configured to control hydraulic pressure transmitted to the first hydraulic circuit and the second hydraulic circuit, the first hydraulic circuit including a first wheel cylinder and a second wheel cylinder, the second hydraulic circuit including a third wheel cylinder and a fourth wheel cylinder; a hydraulic auxiliary device provided in the second hydraulic circuit and configured to supply hydraulic pressure to the third wheel cylinder and the fourth wheel cylinder when the hydraulic pressure supply device is inoperable; and a pair of actuators provided in a caliper of the first wheel cylinder and the second wheel cylinder, respectively, and configured to perform braking of each of the first wheel cylinder and the second wheel cylinder when the hydraulic pressure supply device is inoperable.

The hydraulic auxiliary device includes a pair of pumps configured to pressurize a pressing medium, a motor configured to drive the pair of pumps, a first auxiliary hydraulic passage configured to transmit a pressing medium pressurized by one of the pair of pumps to the third wheel cylinder, and a second auxiliary hydraulic passage configured to transmit a pressing medium pressurized by another of the pair of pumps to the fourth wheel cylinder.

The hydraulic auxiliary device includes a first support valve provided in the first auxiliary hydraulic passage and configured to control flow of a pressing medium, and a second support valve provided in the second auxiliary hydraulic passage and configured to control flow of a pressing medium.

The hydraulic auxiliary device includes a first auxiliary dump passage configured to discharge a pressing medium applied to the third wheel cylinder, and a second auxiliary dump passage configured to discharge a pressing medium applied to the fourth wheel cylinder.

The hydraulic auxiliary device further includes a first discharge valve provided in the first auxiliary dump passage and configured to control flow of a pressing medium, and a second discharge valve provided in the second auxiliary dump passage and configured to control flow of a pressing medium.

The hydraulic auxiliary device further includes a first isolation valve configured to allow and block a pressing medium transmitted from at least one of the master cylinder and the hydraulic pressure supply device to the third wheel cylinder, and a second isolation valve configured to allow and block a pressing medium transmitted from at least one of the master cylinder and the hydraulic pressure supply device to the fourth wheel cylinder.

The master cylinder includes a first master piston connected to the brake pedal, a first master chamber whose volume is changed by a displacement of the first master piston, a second master piston provided to be displaceable by hydraulic pressure of the first master chamber, and a second master chamber whose volume is changed by a displacement of the first master piston.

The electronic brake system further including: a simulation passage configured to constantly hydraulically connect the first master chamber and the pedal simulator.

The pedal simulator includes a simulation piston provided to be displaceable by a pressing medium transmitted through the simulation passage, a simulation chamber whose volume is changed by a displacement of the simulation piston and configured to communicate with the reservoir, and a reaction force spring configured to elastically support the simulation piston.

The electronic brake system further including: a dump passage configured to connect the first hydraulic circuit and the reservoir; and a dump valve provided in the dump passage and configured to control flow of a pressing medium.

The electronic brake system further including: a backup passage configured to connect the second master chamber and the second hydraulic circuit; and a cut valve provided in the backup passage and configured to control flow of a pressing medium.

The electronic brake system further including: a reservoir passage configured to connect the reservoir and the master cylinder, wherein the reservoir passage includes a first reservoir passage configured to communicate the reservoir with the first master chamber, and a second reservoir passage configured to communicate the reservoir with the second master chamber.

The first hydraulic circuit includes a first inlet valve and a second inlet valve configured to control flow of a pressing medium supplied from the hydraulic pressure supply device to the first wheel cylinder and the second wheel cylinder, respectively, and a first outlet valve and a second outlet valve configured to control flow of a pressing medium discharged from the first wheel cylinder and the second wheel cylinder to the reservoir, respectively, and the second hydraulic circuit includes a third inlet valve and a fourth inlet valve configured to control flow of a pressing medium supplied from the hydraulic pressure supply device to the third wheel cylinder and the fourth wheel cylinder, respectively, and a third outlet valve and a fourth outlet valve configured to control flow of a pressing medium discharged from the third wheel cylinder and the fourth wheel cylinder to the reservoir, respectively.

The master cylinder further includes a first piston spring provided between the first master piston and the second master piston, and a second piston spring provided between a cylinder block and the second master piston.

The electronic brake system further including: a dump control unit configured to connect the hydraulic pressure supply device to the reservoir and control flow of a pressing medium.

Advantageous Effects

The electronic brake system according to an aspect of the disclosure can brake a vehicle stably and effectively in various driving situations.

The electronic brake system according to an aspect of the disclosure can improve performance and operational stability of a product.

The electronic brake system according to an aspect of the disclosure can improve ease of assembly and productivity of a product, as well as reduce manufacturing costs.

The electronic brake system according to an aspect of the disclosure can reduce the number of constituent components and reduce a size and weight of the electronic brake system.

BEST MODE OF THE DISCLOSURE

Hereinafter, embodiments of the present disclosure will be described in detail with reference to the accompanying drawings. The following embodiments are provided to fully convey the spirit of the disclosure to a person having ordinary skill in the art to which the present disclosure belongs. The disclosure is not limited to the embodiments shown herein but may be embodied in other forms. The drawings are not intended to limit the scope of the disclosure in any way, and the size of components may be exaggerated for clarity of illustration.

Figure 1:
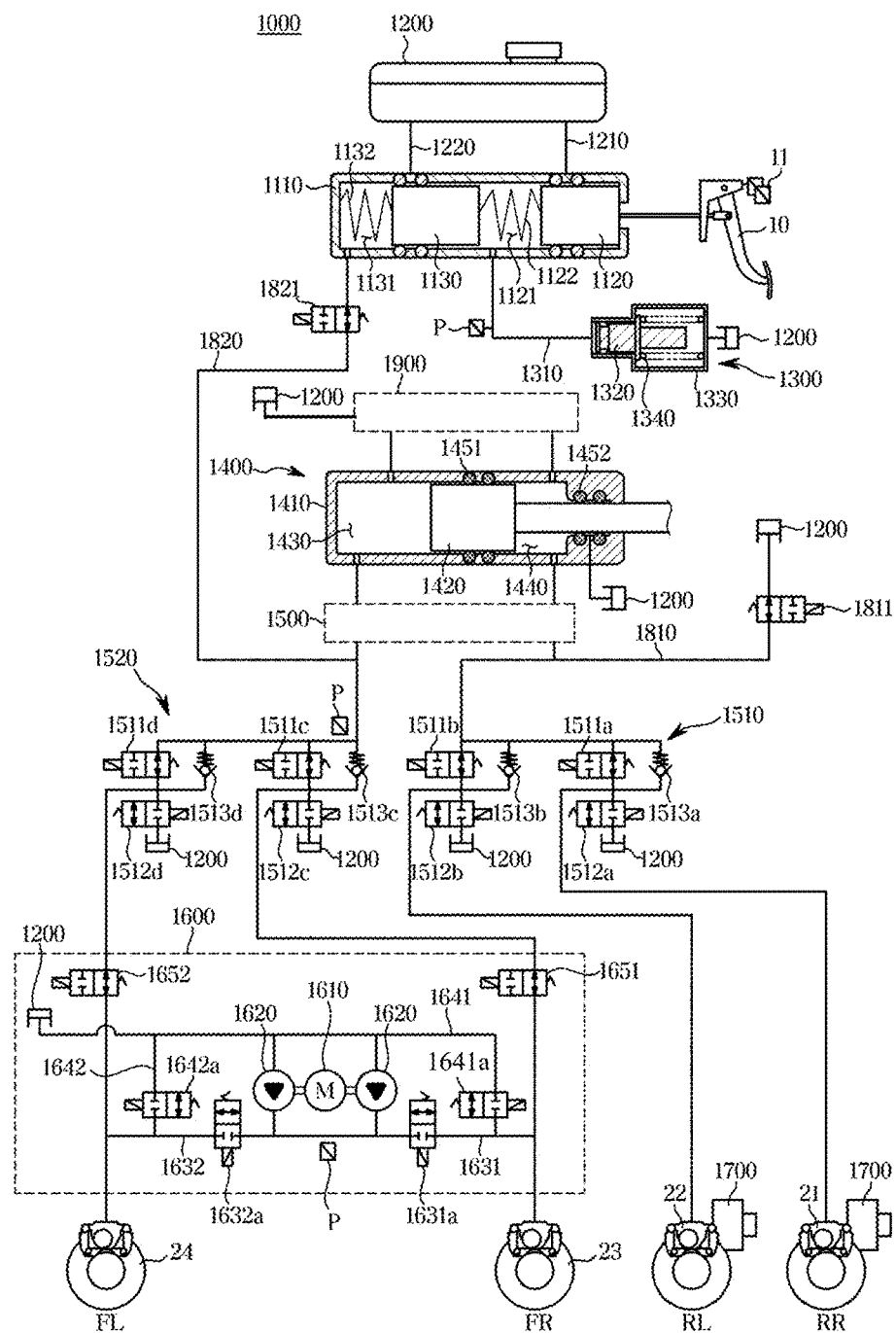
FIG. 1 is a hydraulic circuit diagram illustrating an electronic brake system according to an embodiment of the disclosure.

FIG. 1 is a hydraulic circuit diagram illustrating an electronic brake system 1000 according to an embodiment of the disclosure.

Referring to FIG. 1, according to an embodiment of the disclosure, the electronic brake system 1000 includes a reservoir 1200, a master cylinder 1100, a pedal simulator 1300, a hydraulic pressure supply device 1400, a hydraulic control unit 1500, a hydraulic auxiliary device 1600, a pair of actuators 1700, a dump control unit 1900, and an electronic control unit (ECU, not shown). The reservoir 1200 stores a pressing medium, e.g. brake oil. The master cylinder 1100 pressurizes and discharges the pressing medium included therein by a pedal effort of a brake pedal 10. The pedal simulator 1300 provides a driver with reaction force corresponding to the pedal effort of the brake pedal 10. The hydraulic pressure supply device 1400 generates hydraulic pressure of a pressing medium by mechanically operating upon receiving an electrical signal indicating a driver's braking intention from a pedal displacement sensor 11 sensing a displacement of the brake pedal 10. The hydraulic control unit 1500 controls the hydraulic pressure applied to wheel cylinders. The hydraulic auxiliary device 1600 provides hydraulic pressure to two wheel cylinders when the hydraulic pressure supply device 1400 is inoperable. The pair of actuators 1700 perform braking of the other two wheel cylinders when the hydraulic pressure supply device 1400 is inoperable. The dump control unit 1900 hydraulically connects the reservoir 1200 and the hydraulic pressure supply device 1400 and controls flow of a pressing medium therebetween. The ECU controls operations of each constituent component based on hydraulic pressure information and pedal displacement information.

The master cylinder 1100 operates by the brake pedal 10, includes at least one chamber and piston, and thereby may pressurize and discharge the pressing medium included therein.

Specifically, the master cylinder 1100 includes a cylinder block 1110, a first master chamber 1121, a first master piston 1120, a second master chamber 1131, a second master piston 1130, a first piston spring 1122 and a second piston spring 1132. The first master chamber 1121 is formed at an inlet of the cylinder block 1110 connected to the brake pedal 10. The first master piston 1120 is provided in the first master chamber 1121, connected to the brake pedal 10, and provided to be displaceable according to movement of the brake pedal 10. The second master chamber 1131 is formed inside of the cylinder block 1110. The second master piston 1130 is provided in the second master chamber 1131 and provided to be displaceable by hydraulic pressure formed in the first master chamber 1121 according to a displacement of the first master piston 1120. The first piston spring 1122 elastically supports the first master piston 1120 and the second piston spring 1132 elastically supports the second master piston 1130.

The first master chamber 1121 and the second master chamber 1131 may be sequentially formed in the cylinder block 1110 from the brake pedal 10 side (right side when viewed from FIG. 1) to an inner side (left side when viewed from FIG. 1). The first master piston 1120 and the second master piston 1130 are disposed on the same axis as the first master chamber 1121 and the second master chamber 1131, respectively. Also, the first master piston 1120 and the second master piston 1130 may pressurize a pressing medium accommodated in each chamber or form negative pressure according to a forward or backward movement.

In the first master chamber 1121, a pressing medium may be flowed into and discharged through a first hydraulic port and a second hydraulic port. The first hydraulic port is connected to a first reservoir passage 1210, and thus the pressing medium may be flowed into the first master chamber 1121 from the reservoir 1200. A pair of sealing members are provided before (left side when viewed from FIG. 1) and after (right side when viewed from FIG. 1) the first hydraulic port to seal the first master chamber 1121. The second hydraulic port is connected to a simulation passage 1310 to be described later, and thereby may constantly hydraulically connect the first master chamber 1121 and the pedal simulator 1300. Accordingly, the pressing medium in the first master chamber 1121 is discharged to the simulation passage 1310 by a forward movement (left side when viewed from FIG. 1) of the first master piston 1120, and thereby may be supplied to the pedal simulator 1300, which will be described in detail later.

The first master piston 1120 is accommodated in the first master chamber 1121, and may pressurize the pressing medium in the first master chamber 1121 by moving forward (left side when viewed from FIG. 1), or may form negative pressure inside of the first master chamber 1121 by moving backward (left side when viewed from FIG. 1). Specifically, when the first master piston 1120 moves forward, volume of the first master chamber 1121 decreases, the pressing medium in the first master chamber 1121 is pressurized to form hydraulic pressure, and thereby may be discharged to the simulation passage 1310. By contrast, when the first master piston 1120 moves backward, volume of the first master chamber 1121 increases, the pressing medium in the first master chamber 1121 is decompressed, and negative pressure may be formed simultaneously.

In the second master chamber 1131, a pressing medium may be flowed into and discharged through a third hydraulic port and a fourth hydraulic port. The third hydraulic port is connected to a second reservoir passage 1220, and thus the pressing medium may be flowed into the second master chamber 1131 from the reservoir 1200. A pair of sealing members are provided before and after the third hydraulic port to seal the second master chamber 1131. The fourth hydraulic port is connected to a backup passage 1820 to be described later, and thereby may connect the second master chamber 1131 and a second hydraulic circuit 1520. Accordingly, when the hydraulic pressure supply device 1400 to be described later and the hydraulic auxiliary device 1600 to be described later are inoperable, the pressing medium in the second master chamber 1131 is discharged to the backup passage 1820 by a forward movement of the second master piston 1130, and thereby may perform braking of a third wheel cylinder 23 and a fourth wheel cylinder 24 of the second hydraulic circuit 1520, which will be described in detail later.

The second master piston 1130 is accommodated in the second master chamber 1131, and may pressurize the pressing medium in the second master chamber 1131 by moving forward, or may form negative pressure inside of the second master chamber 1131 by moving backward. Specifically, when the second master piston 1130 moves forward, volume of the second master chamber 1131 decreases, the pressing medium in the second master chamber 1131 is pressurized to form hydraulic pressure, and thereby may be discharged to the backup passage 1820. By contrast, when the second master piston 1130 moves backward, volume of the second master chamber 1131 increases, the pressing medium in the second master chamber 1131 is decompressed and negative pressure may be formed simultaneously.

The first piston spring 1122 and the second piston spring 1132 are provided to elastically support the first master piston 1120 and the second master piston 1130, respectively. For the above, the first piston spring 1122 may be disposed between a front surface (left end when viewed from FIG. 1) of the first master piston 1120 and a rear surface (right end when viewed from FIG. 1) of the second master piston 1130, and the second piston spring 1132 may be disposed between a front surface (left end when viewed from FIG. 1) of the second master piston 1130 and an inner side of the cylinder block 1110. When displacement occurs in the first master piston 1120 and the second master piston 1130 according to an operation such as braking, and the like, each of the first piston spring 1122 and the second piston spring 1132 is compressed. Afterwards, when the operation such as braking is released, the first piston spring 1122 and the second piston spring 1132 extend by elastic force, and each of the first master piston 1120 and the second master piston 1130 may return to their original positions.

A reservoir passage is provided to hydraulically connect the reservoir 1200 and the master cylinder 1100. The reservoir passage may include the first reservoir passage 1210 that connects the first master chamber 1121 and the reservoir 1200 and the second reservoir passage 1220 that connects the second master chamber 1131 and the reservoir 1200.

The pedal simulator 1300 may receive the pressing medium discharged from the first master chamber 1121 and provide the driver with reaction force corresponding to a pedal effort of the brake pedal 10. Due to the reaction force corresponding to the pedal effort of the brake pedal 10 by the pedal simulator 1300, a sense of pedaling may be provided to the driver, a delicate operation of the brake pedal 10 may be performed, and a braking force of a vehicle may be precisely adjusted.

The pedal simulator 1300 may include a simulation piston 1320, a simulation chamber 1330, and a reaction force spring 1340. The simulation piston 1320 is provided to be displaceable by the pressing medium discharged from the first master chamber 1121 of the master cylinder 1100. The simulation chamber 1330 discharges the pressing medium included therein by a displacement of the simulation piston 1320 to the reservoir 1200. The reaction force spring 1340 elastically supports the simulation piston 1320.

A displacement occurs in the simulation piston 1320 by the pressing medium supplied from the first master chamber 1121 through the simulation passage 1310. The reaction force spring 1340 is compressed by the displacement of the simulation piston 1320, volume of the simulation chamber 1330 decreases, and thus the pressing medium in the simulation chamber 1330 is transmitted to the reservoir 1200. Even when the simulation piston 1320 returns to its original position according to release of the brake pedal 10, the pressing medium flows into the simulation chamber 1330 from the reservoir 1200, and thus the simulation chamber 1330 may be constantly filled with the pressing medium. Accordingly, friction of the simulation piston 1320 when the pedal simulator 1300 operates may be minimized, and thus durability of the pedal simulator 1300 may be improved and inflow of foreign materials from outside may be prevented.

The reaction force spring 1340 shown in figure is only an example of providing elastic force to the simulation piston 1320, and may have various structures as long as it may store elastic force. For instance, the reaction force spring 1340 may be made of a material such as rubber, etc., or be formed of a variety of members capable of storing elastic force in a coil or plate shape.

The pedal simulator 1300 operates as follows. When the driver operates the brake pedal 10 to apply a pedal effort, the first master piston 1120 moves forward, the pressing medium in the first master chamber 1121 is supplied to a front side (left end when viewed from FIG. 1) of the simulation piston 1320 through the simulation passage 1310, and thus a displacement occurs in the simulation piston 1320. In this instance, the pressing medium filled in the simulation chamber 1330 may be transmitted to the reservoir 1200, the simulation piston 1320 compresses the reaction force spring 1340, and reaction force corresponding to the compression is provided as a sense of pedaling to the driver.

Afterwards, when the driver releases the pedal effort applied to the brake pedal 10, the reaction force spring 1340 extends by elastic force, and the simulation piston 1320 returns to its original position. Also, the pressing medium applied to a front side of the simulation piston 1320 returns to the first master chamber 1121 through the simulation passage 1310, and the simulation chamber 1330 may be filled with the pressing medium supplied from the reservoir 1200.

Since the simulation passage 1310 according to an embodiment of the disclosure constantly hydraulically connects the first master chamber 1121 of the master cylinder 1100 and the pedal simulator 1300, constant operation of the pedal simulator 1300 may be performed in a normal operation mode as well as a first fallback mode and a second fallback mode which are implemented due to a malfunction of a constituent component. Accordingly, a consistent sense of pedaling may be provided to the driver in any situation.

The hydraulic pressure supply device 1400 generates hydraulic pressure of a pressing medium by reciprocating a hydraulic piston 1420 upon receiving an electrical signal indicating a driver's braking intention from the pedal displacement sensor 11 sensing a displacement of the brake pedal 10.

The hydraulic pressure supply device 1400 may include a hydraulic providing unit and a power providing unit (not shown). The hydraulic providing unit provides pressure of a pressing medium to the wheel cylinders, and the power providing unit generates power of the hydraulic piston 1420 based on an electrical signal of the pedal displacement sensor 11.

The hydraulic providing unit includes a cylinder block 1410, the hydraulic piston 1420 and a sealing member. The cylinder block 1410 is provided to receive a pressing medium, the hydraulic piston 1420 is accommodated in the cylinder block 1410, and the sealing member is provided between the cylinder block 1410 and the hydraulic piston 1420 to seal a pressure chamber.

The pressure chamber may include a first pressure chamber 1430 and a second pressure chamber 1440. The first pressure chamber 1430 is disposed in front of the hydraulic piston 1420 (in a left direction of the hydraulic piston 1420 when viewed from FIG. 1), and the second pressure chamber 1440 is disposed at a rear of the hydraulic piston 1420 (in a right direction of the hydraulic piston 1420 when viewed from FIG. 1). That is, the first pressure chamber 1430 is partitioned by a front surface of the hydraulic piston 1420 and the cylinder block 1410 so that volume of the first pressure chamber 1430 varies according to a movement of the hydraulic piston 1420. Also, the second pressure chamber 1440 is partitioned by a rear surface of the hydraulic piston 1420 and the cylinder block 1410 so that volume of the second pressure chamber 1440 varies according to the movement of the hydraulic piston 1420.

The first pressure chamber 1430 may be hydraulically connected to the hydraulic control unit 1500 to be described later by a hydraulic passage. The second pressure chamber 1440 may be hydraulically connected to the hydraulic control unit 1500 by the hydraulic passage.

The sealing member includes a piston sealing member 1451 and a shaft sealing member 1452. The piston sealing member 1451 is provided between the hydraulic piston 1420 and the cylinder block 1410 and seals between the first pressure chamber 1430 and the second pressure chamber 1440. The shaft sealing member 1452 is provided between the power providing unit and the cylinder block 1410 and seals an opening of the cylinder block 1410 and the second pressure chamber 1440. Hydraulic pressure or negative pressure of the first pressure chamber 1430 and the second pressure chamber 1440 generated by a forward or backward movement of the hydraulic piston 1420 may be sealed by the piston sealing member 1451 and the shaft sealing member 1452 and be transmitted to the hydraulic passage without leaking.

The power providing unit may generate and provide power of the hydraulic piston 1420 by an electrical signal. For example, the power providing unit may include a motor (not shown) for generating rotational force and a power conversion unit (not shown) for converting the rotational force of the motor into a transitional movement of the hydraulic piston 1420, without being limited thereto.

The dump control unit 1900 may include a plurality of passages and various solenoid valves to hydraulically connect the reservoir 1200 and the hydraulic pressure supply device 1400. The solenoid valves of the dump control unit 1900 may be electrically operated and controlled by the ECU.

The first pressure chamber 1430 and the second pressure chamber 1440 may be connected to the reservoir 1200 through the dump control unit 1900. The first pressure chamber 1430 and the second pressure chamber 1440 may be supplied with a pressing medium from the reservoir 1200 through the dump control unit 1900, or the pressing medium in the first pressure chamber 1430 and the second pressure chamber 1440 may be transmitted to the reservoir 1200 through the dump control unit 1900.

The hydraulic control unit 1500 is provided between the hydraulic pressure supply device 1400 and the wheel cylinders, and an operation of the hydraulic control unit 1500 is controlled by the ECU to adjust hydraulic pressure transmitted to the wheel cylinders.

The hydraulic control unit 1500 may include a first hydraulic circuit 1510 and a second hydraulic circuit 1520. The first hydraulic circuit 1510 controls flow of a pressing medium transmitted to a first wheel cylinder 21 and a second wheel cylinder 22 among four wheel cylinders, and the second hydraulic circuit 1520 controls flow of a pressing medium transmitted to a third wheel cylinder 23 and a fourth wheel cylinder 24. Also, the hydraulic control unit 1500 may include a plurality of hydraulic passages and solenoid valves to control the hydraulic pressure transmitted to the wheel cylinders from the master cylinder 1100 and the hydraulic pressure supply device 1400.

The first wheel cylinder 21 and the second wheel cylinder 22 of the first hydraulic circuit 1510 may be provided as a rear right wheel RR and a rear left wheel RL, respectively. The third wheel cylinder 23 and the fourth wheel cylinder 24 of the second hydraulic circuit 1520 may be provided as a front right wheel FR and a front left wheel FL, respectively. That is, the first and the second hydraulic circuits 1510 and 1520 are provided in a F-R split configuration where the front and rear wheels of the vehicle are independently controlled.

The first and second hydraulic circuits 1510 and 1520 may include first to fourth inlet valves 1511a, 1511b, 1511c, 1511d to control flow of the pressing medium applied to the first to fourth wheel cylinders 21, 22, 23 and 24, respectively. The first to fourth inlet valves 1511a, 1511b, 1511c, 1511d may be arranged upstream of the first to fourth wheel cylinders 21, 22, 23 and 24, respectively. Also, the first to fourth inlet valves 1511a, 1511b, 1511c, 1511d may be implemented as normal open type solenoid valves that remain open in a normal state and are then closed upon receiving an electric signal from the ECU.

The first and second hydraulic circuits 1510 and 1520 may include first to fourth check valves 1513a, 1513b, 1513c, and 1513d connected in parallel to the first to fourth inlet valves 1511a, 1511b, 1511c, and 1511d. The first to fourth check valves 1513a, 1513b, 1513c, and 1513d may be provided in bypass passages by which front ends and rear ends of the respective inlet valves 1511a, 1511b, 1511c, and 1511d are connected to one another in the first and second hydraulic circuits 1510 and 1520. The first to fourth check valves 1513a, 1513b, 1513c, and 1513d may only allow flow of the pressing medium discharged from each of the wheel cylinders, and block the pressing medium from flowing from the hydraulic pressure supply device 1400 to the wheel cylinders. The first to fourth check valves 1513a, 1513b, 1513c, and 1513d may allow hydraulic pressure of the pressing medium applied to each of the wheel cylinders to be rapidly discharged. Even when the inlet valves 1511a, 1511b, 1511c, and 1511d do not normally operate, hydraulic pressure of the pressing medium applied to the wheel cylinders may be smoothly discharged.

The first hydraulic circuit 1510 may include first and second outlet valves 1512a and 1512b that adjust hydraulic pressure of a pressing medium discharged to improve performance when braking of the first and second wheel cylinders 21 and 22 is released. The first and second outlet valves 1512a and 1512b may sense brake pressure of the first and second wheel cylinders 21 and 22, and may be selectively open to control decompression of the wheel cylinders when decompression braking such as anti-lock braking system (ABS) dump mode, etc., is needed. The first and second outlet valves 1512a and 1512b may be implemented as normal closed type solenoid valves that remain closed in a normal state and are then open upon receiving an electrical signal from the ECU.

The second hydraulic circuit 1520 may include third and fourth outlet valves 1512c and 1512d that adjust hydraulic pressure of a pressing medium discharged to improve performance when braking of the third and fourth wheel cylinders 23 and 24 is released. The third and fourth outlet valves 1512c and 1512d may sense brake pressure of the third and fourth wheel cylinders 23 and 24, and may be selectively open to control decompression of the wheel cylinders when decompression braking such as ABS dump mode, etc., is needed. The third and fourth outlet valves 1512c and 1512d may be implemented as normal closed type solenoid valves that remain closed in a normal state and are then open upon receiving an electrical signal from the ECU.

The hydraulic auxiliary device 1600 is provided on a side of the third and fourth wheel cylinders 23 and 24 of the second hydraulic circuit 1520, and may generate and provide hydraulic pressure required for braking of the third and fourth wheel cylinders 23 and 24, when the hydraulic pressure supply device 1400 is inoperable due to a malfunction, etc. A first fallback mode refers to a mode where the hydraulic auxiliary device 1600 operates due to the inoperability of the hydraulic pressure supply device 1400.

The hydraulic auxiliary device 1600 includes a pair of pumps 1620, a motor 1610, a first auxiliary hydraulic passage 1631, a second auxiliary hydraulic passage 1632, a first support valve 1631a, a second support valve 1632a, a first auxiliary dump passage 1641, a second auxiliary dump passage 1642, a first discharge valve 1641a, a second discharge valve 1642a, a first isolation valve 1651 and a second isolation valve 1652. The pair of pumps 1620 pressurize a pressing medium, and the motor 1610 drives the pair of pumps 1620. The first auxiliary hydraulic passage 1631 transmits the pressing medium pressurized by the pump 1620 to the third wheel cylinder 23, and the second auxiliary hydraulic passage 1632 transmits the pressing medium pressurized by the pump 1620 to the fourth wheel cylinder 24. The first support valve 1631a is provided on the first auxiliary hydraulic passage 1631 and controls flow of the pressing medium, and the second support valve 1632a is provided on the second auxiliary hydraulic passage 1632 and controls flow of the pressing medium. The first auxiliary dump passage 1641 discharges the pressing medium applied to the third wheel cylinder 23, and the second auxiliary dump passage 1642 discharges the pressing medium applied to the fourth wheel cylinder 24 to the reservoir 1200. The first discharge valve 1641a is provided on the first auxiliary dump passage 1641 and controls flow of the pressing medium, and the second discharge valve 1642a is provided on the second auxiliary dump passage 1642 and controls flow of the pressing medium. The first isolation valve 1651 controls flow of the pressing medium transmitted to the third wheel cylinder 23 from at least one of the master cylinder 1100 and the hydraulic pressure supply device 1400. The second isolation valve 1652 controls flow of the pressing medium transmitted to the fourth wheel cylinder 24 from at least one of the master cylinder 1100 and the hydraulic pressure supply device 1400.

When it is identified that the hydraulic pressure supply device 1400 is inoperable due to a malfunction, etc., the ECU operates the hydraulic auxiliary device 1600, specifically, the motor 1610. The motor 1610 may operate upon receiving an electrical signal indicating a driver's braking intention from the pedal displacement sensor 11 sensing a displacement of the brake pedal 10. Also, the motor 1610 may operate the pair of pumps 1620 by supplying power from a battery, and the like.

The pair of pumps 1620 may pressurize a pressing medium according to reciprocation of a piston (not shown) provided in the motor 1610. The pump 1620 receives the pressing medium from a passage for inflow connected to the reservoir 1200, and pressurizes the pressing medium at the same level as a hydraulic pressure level required for braking by an operation of the motor 1610.

The pressing medium whose hydraulic pressure is generated by one of the pair of pumps 1620 may be transmitted to the third wheel cylinder 23 by the first auxiliary hydraulic passage 1631 corresponding to a passage for discharge of the pump 1620. For the above, the first auxiliary hydraulic passage 1631 has an inlet end connected to a discharge side of the pump 1620, and an outlet end connected to the third wheel cylinder 23. Also, the first auxiliary hydraulic passage 1631 includes the first support valve 1631*a* for controlling flow of the pressing medium transmitted from the pump 1620 to the third wheel cylinder 23. The first support valve 1631*a* may be implemented as a normal closed type solenoid valve that remains closed in a normal state and is then open upon receiving an electrical signal from the ECU.

The pressing medium whose hydraulic pressure is generated by the other of the pair of pumps 1620 may be transmitted to the fourth wheel cylinder 24 by the second auxiliary hydraulic passage 1632 which is a passage for discharge in the pump 1620. For the above, the second auxiliary hydraulic passage 1632 has an inlet end connected to a discharge side of the pump 1620, and an outlet end connected to the fourth wheel cylinder 24. Also, the second auxiliary hydraulic passage 1632 includes the second support valve 1632*a* for controlling flow of the pressing medium transmitted from the pump 1620 to the fourth wheel cylinder 24. Like the first support valve 1631*a*, the second support valve 1632*a* may be implemented as a normal closed type solenoid valve that remains closed in a normal state and is then open upon receiving an electrical signal from the ECU.

The pressing medium applied to the third wheel cylinder 23 may be discharged through the first auxiliary dump passage 1641. For the above, the first auxiliary dump passage 1641 has an end connected to the third wheel cylinder 23 or a downstream side of the first support valve 1631*a* of the first auxiliary hydraulic passage 1631, and the other end directly connected to the reservoir 1200 or connected to an inflow side of the pump 1620. The first auxiliary dump passage 1641 includes the first discharge valve 1641*a* for controlling flow of the pressing medium discharged from the third wheel cylinder 23. The first discharge valve 1641*a* may be implemented as a normal closed type solenoid valve that remains closed in a normal state and then is open upon receiving an electrical signal from the ECU.

The pressing medium applied to the fourth wheel cylinder 24 may be discharged through the second auxiliary dump passage 1642. For the above, the second auxiliary dump passage 1642 has an end connected to the fourth wheel cylinder 24 or a downstream side of the second support valve 1632*a* of the second auxiliary hydraulic passage 1632, and the other end directly connected to the reservoir 1200 or connected to an inflow side of the pump 1620. The second auxiliary dump passage 1642 includes the second discharge valve 1642*a* for controlling flow of the pressing medium discharged from the fourth wheel cylinder 24. Like the first discharge valve 1641*a*, the second discharge valve 1642*a* may be implemented as a normal closed type solenoid valve that remains closed in a normal state and then is open upon receiving an electrical signal from the ECU.

Meanwhile, when the pressing medium is transmitted to the third and fourth wheel cylinders 23 and 24 from the hydraulic pressure supply device 1400 or the master cylinder 110 during an operation of the hydraulic auxiliary device 1600, a level of braking required by the driver is different from that of braking practically performed by the third and fourth wheel cylinders 23 and 24, which may lead to a safety accident. Also, when the hydraulic pressure generated and provided by the hydraulic auxiliary device 1600 is not properly transmitted to the third and fourth wheel cylinders 23 and 24 and leaks to other constituent components, braking of wheel cylinders may not be performed.

Accordingly, the first isolation valve 1651 and the second isolation valve 1652 of the hydraulic auxiliary device 1600 are provided to allow and block a hydraulic connection between the hydraulic auxiliary device 1600 and at least one of the master cylinder 1100 and the hydraulic pressure supply device 1400.

The first isolation valve 1651 is provided between the first auxiliary hydraulic passage 1631 and a downstream side of the third inlet valve 1511*c* of the third wheel cylinder 23 to allow and block flow of the pressing medium. The first isolation valve 1651 may be implemented as a normal open type solenoid valve that remains open in a normal state and is then closed upon receiving an electric signal from the ECU. When it is identified that the hydraulic pressure supply device 1400 is inoperable, the ECU closes the first isolation valve 1651 so that the hydraulic pressure generated and provided by the hydraulic auxiliary device 1600 is supplied to the third wheel cylinder 23 without leaking.

The second isolation valve 1652 is provided between the second auxiliary hydraulic passage 1632 and a downstream side of the fourth inlet valve 1511*d* of the fourth wheel cylinder 24 to allow and block flow of the pressing medium. The second isolation valve 1652 may be implemented as a normal open type solenoid valve that remains open in a normal state and is then closed upon receiving an electric signal from the ECU. When it is identified that the hydraulic pressure supply device 1400 is inoperable, the ECU closes the second isolation valve 1652 so that the hydraulic pressure generated and provided by the hydraulic auxiliary device 1600 is supplied to the fourth wheel cylinder 24 without leaking.

The pair of actuators 1700 are provided in a caliper of the first and second wheel cylinders 21 and 22 of the first hydraulic circuit 1510, respectively. Also, when the hydraulic pressure supply device 1400 is inoperable due to a malfunction, etc., the pair of actuators 1700 operate to perform braking of the first and second wheel cylinders 21 and 22.

When it is identified that the hydraulic pressure supply device 1400 is inoperable, the ECU operates the pair of actuators 1700. The actuator 1700 operates upon receiving an electrical signal indicating a driver's braking intention from the pedal displacement sensor 11 sensing a displacement of the brake pedal 10, and also may provide the first and second wheel cylinders 21 and 22 with the same level of braking force as braking force applied to the third and fourth wheel cylinders 23 and 24 by the hydraulic auxiliary device 1600.

The pair of actuators 1700 are installed on a caliper of the first and second wheel cylinders 21 and 22, respectively, and may include a motor (not shown) that operates electromechanically and a gear unit (not shown) that receives rotational force of the motor and approaches and separates the caliper to/from a wheel disc side.

An operation amount of the motor may be controlled based on an electrical signal transmitted by the ECU. The gear unit may have various configurations, e.g., planetary gear assembly, spindle-nut configuration, etc., for transmitting power of the motor to a brake pad of the caliper. That is, the brake pad pressurizes a wheel disc due to received rotational force, friction is generated, and thus braking of the first and second wheel cylinders 21 and 22 may be performed.

When the hydraulic pressure supply device 1400 is inoperable, the actuator 1700 may perform a base brake function of wheel cylinders together with the hydraulic auxiliary device 1600. The actuator 1700 may also perform a parking brake function when a vehicle is parked.

When the pair of actuators 1700 operate, hydraulic pressure of the pressing medium applied to the first and second wheel cylinders 21 and 22 is required to be removed for detailed control of braking force. Accordingly, when braking of the first and second wheel cylinders 21 and 22 is performed by operating the pair of actuators 1700, the pressing medium applied to the first and second wheel cylinders 21 and 22 may be discharged through a dump passage 1810 and transmitted to the reservoir 1200.

The dump passage 1810 is provided to connect the reservoir 1200 to the first hydraulic circuit 1510, and may include a dump valve 1811 for controlling flow of pressing medium. The dump valve 1811 may be implemented as a normal open type solenoid valve that remains open in a normal state and is then closed upon receiving a closed signal from the ECU.

The dump valve 1811 is controlled in a closed state in a general braking situation, and thus hydraulic pressure supplied by the hydraulic pressure supply device 1400 may be supplied to the first and second wheel cylinders 21 and 22 through the first hydraulic circuit 1510 without leaking into the reservoir 1200. However, when the actuator 1700 starts operating due to the inoperability of the hydraulic pressure supply device 1400, the dump valve 1811 becomes open, and thus the pressing medium applied to the first and second wheel cylinders 21 and 22 may be discharged. Accordingly, braking of the first and second wheel cylinders 21 and 22 by the actuator 1700 may be performed smoothly and delicately.

Meanwhile, according to an embodiment of the disclosure, when the hydraulic auxiliary device 1600 is inoperable, the electronic brake system 1000 may directly supply a pressing medium discharged from the master cylinder 1100 to the second hydraulic circuit 1520 to perform braking of the third and fourth wheel cylinders 23 and 24. A second fallback mode refers to a mode where the hydraulic auxiliary device 1600 operates due to the inoperability of the hydraulic pressure supply device 1400 and the hydraulic auxiliary device 1600.

The backup passage 1820 is provided to connect the second master chamber 1131 of the master cylinder 1100 and the second hydraulic circuit 1520, and may include a cut valve 1821 for controlling flow of pressing medium. The cut valve 1821 may be implemented as a normal open type solenoid valve that remains open in a normal state and is then closed upon receiving a closed signal from the ECU.

The cut valve 1821 is controlled in a closed state in a general braking situation, and thus hydraulic pressure supplied by the hydraulic pressure supply device 1400 may be supplied to the third and fourth wheel cylinders 23 and 24 through the second hydraulic circuit 1520 without leaking into the master cylinder 1100. However, when the hydraulic pressure supply device 1400 and the hydraulic auxiliary device 1600 are inoperable, the cut valve 1821 becomes open, and thus the pressing medium supplied from the second master chamber 1131 of the master cylinder 1100 may be supplied to the third and fourth wheel cylinders 23 and 24 through the backup passage 1820 to perform braking.

According to an embodiment of the disclosure, the electronic brake system 1000 further includes a plurality of pressure sensors P. The plurality of pressure sensors P are arranged in various passages to sense hydraulic pressure of pressing medium. It is illustrated in FIG. 1 that the pressure sensors P are arranged on the simulation passage 1310 and the second hydraulic circuit 1520, respectively, without being limited thereto. A position of the pressure sensor may vary to sense the hydraulic pressure of pressing medium.

Hereinafter, an operation of the electronic brake system 1000 according to an embodiment of the disclosure is described in detail.

According to an embodiment of the disclosure, the electronic brake system 1000 may implement the normal operation mode which performs normally without a malfunction or error of an constituent component and valve, the first fallback mode where the hydraulic auxiliary device 1600 and the actuator 1700 operate due to the inoperability of the hydraulic pressure supply device 1400, and the second fallback mode where both the hydraulic auxiliary device 1600 and the hydraulic pressure supply device 1400 are inoperable.

The normal operation mode of the electronic brake system 1000 according to an embodiment of the disclosure is described below.

Figure 2:
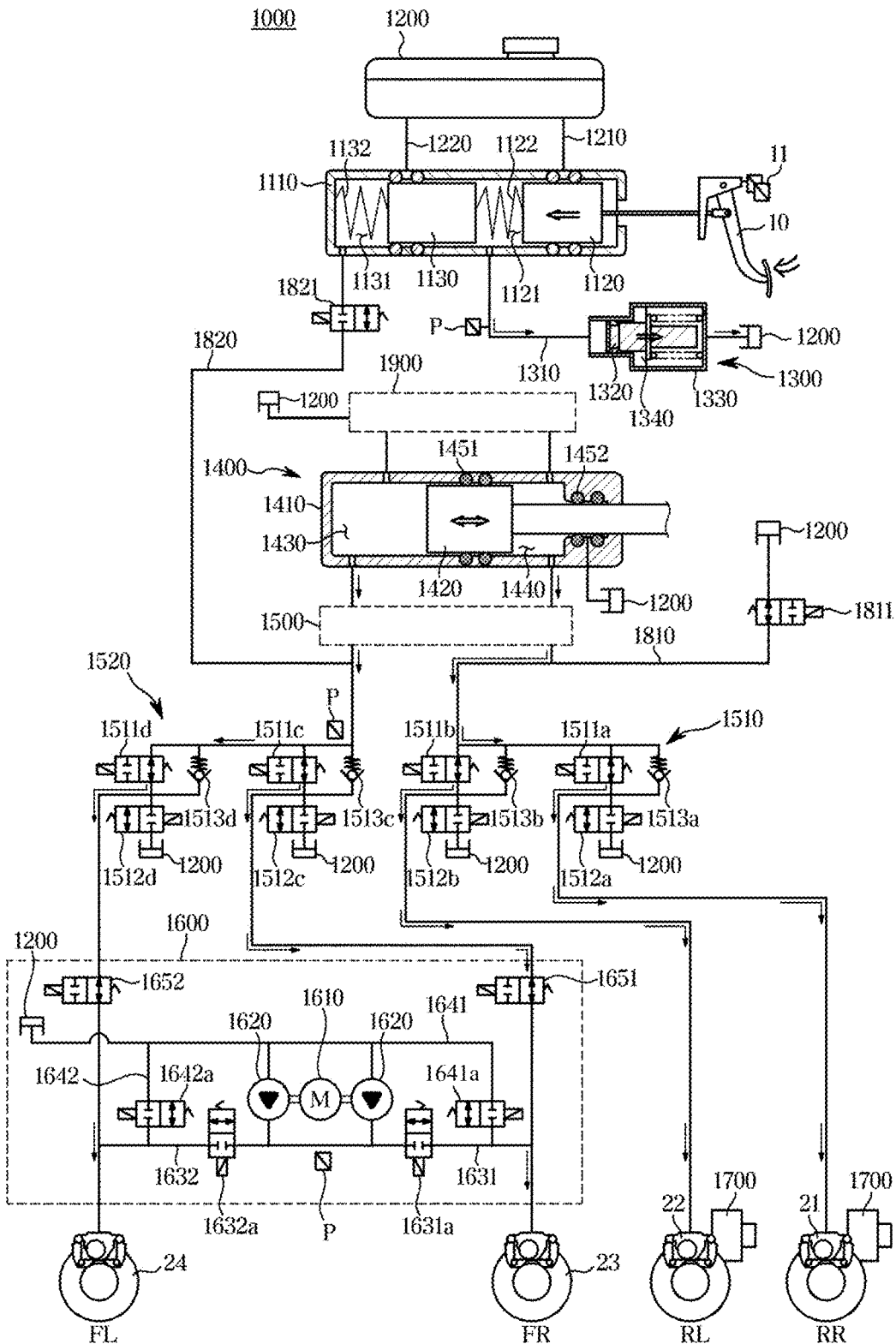
FIG. 2 is a hydraulic circuit diagram illustrating a state where a normal operation mode of an electronic brake system is implemented according to an embodiment of the disclosure.

FIG. 2 is a hydraulic circuit diagram illustrating a state where a normal operation mode of the electronic brake system 1000 is implemented according to an embodiment of the disclosure. Referring to FIG. 2, when the electronic brake system 1000 operates normally and a pedal effort is applied to the brake pedal 10 by a driver, the first master piston 1120 moves forward, and thus a pressing medium in the first master chamber 1121 is transmitted to the pedal simulator 1300 through the simulation passage 1310. The simulation piston 1320 is advanced by the pressing medium transmitted to the pedal simulator 1300, and thereby may compress the reaction force spring 1340. Accordingly, elastic restoring force of the reaction force spring 1340 is provided as a sense of pedaling to the driver. In this instance, the pressing medium in the simulation chamber 1330 is discharged to the reservoir 1200. Meanwhile, since the cut valve 1821 is controlled in a closed state in the normal operation mode, the second master chamber 1131 is sealed.

The ECU operates the hydraulic pressure supply device 1400 based on pedal displacement information of the brake pedal 10 sensed by the pedal displacement sensor 11. Hydraulic pressure of a pressing medium in a pressure chamber is formed by a forward and backward movement of the hydraulic piston 1420 of the hydraulic pressure supply device 1400. Also, the hydraulic piston 1420 provides the pressing medium to the first to fourth wheel cylinders 21, 22, 23 and 24 through the hydraulic control unit 1500 to perform braking.

In the normal operation mode, since the hydraulic pressure supply device 1400 operates normally, the hydraulic auxiliary device 1600 does not operate. Also, the first isolation valve 1651 and the second isolation valve 1652 remain open, and thereby may smoothly provide the hydraulic pressure of the pressing medium supplied from the hydraulic pressure supply device 1400 to the third and fourth wheel cylinders 23 and 24. Further, in the normal operation mode, since the pair of actuators 1700 do not operate and the dump valve 1811 is controlled in a closed state, the hydraulic pressure of the pressing medium supplied from the hydraulic pressure supply device 1400 may be provided to the first and second wheel cylinders 21 and 22 without leaking into the dump passage 1810.

Figure 3:
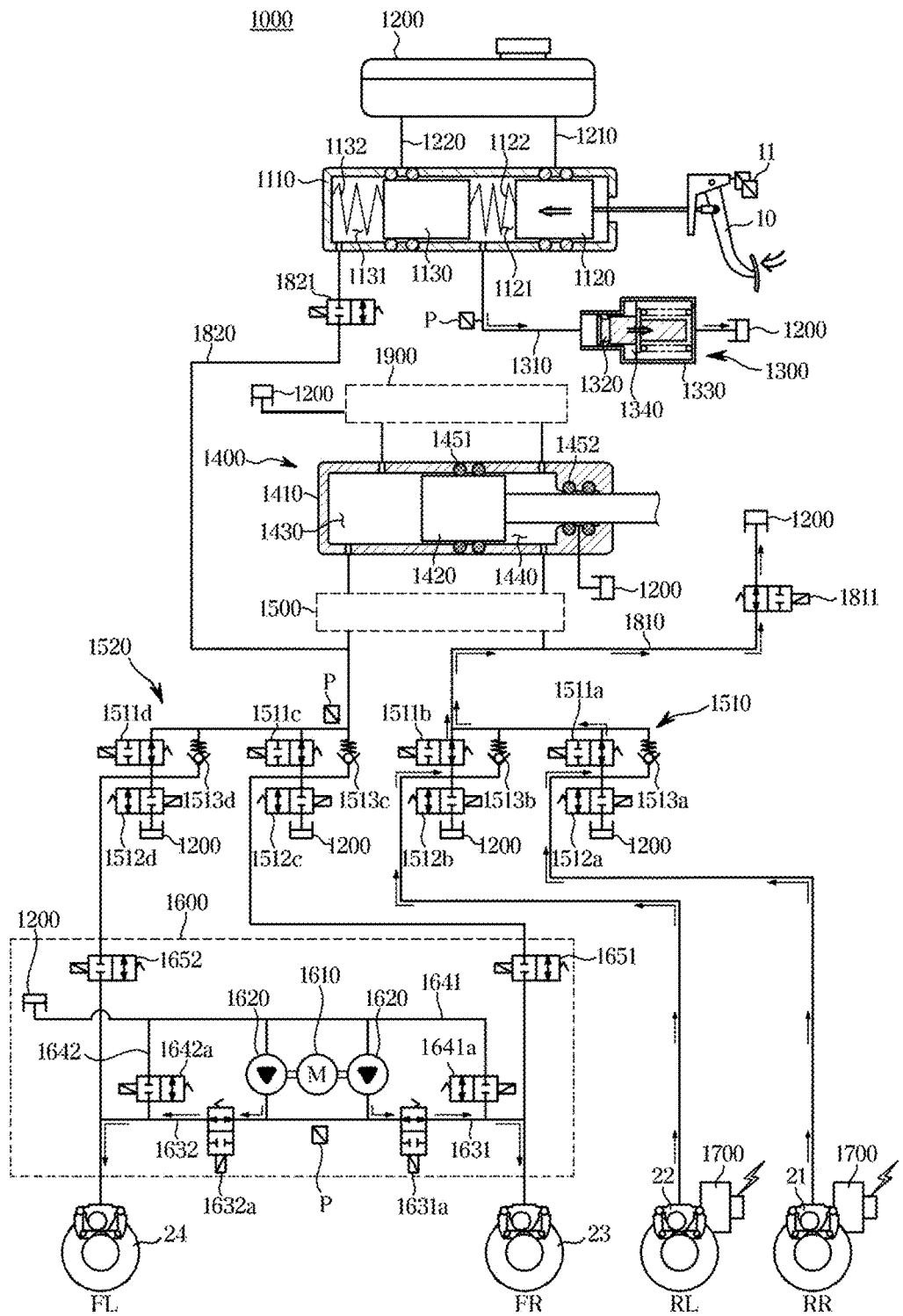
FIG. 3 is a hydraulic circuit diagram illustrating a state where a first fallback mode is implemented when a hydraulic pressure supply device of an electronic brake system is suspended according to an embodiment of the disclosure.

The electronic brake system 1000 according to an embodiment of the disclosure may switch to the first fallback mode shown in FIG. 3, when the hydraulic pressure supply device 1400 is inoperable due to a malfunction, leakage of pressing medium, etc.

FIG. 3 is a hydraulic circuit diagram illustrating a state where a first fallback mode is implemented when the hydraulic pressure supply device 1400 of the electronic brake system 1000 is suspended according to an embodiment of the disclosure. Referring to FIG. 3, when it is identified that the hydraulic pressure supply device 1400 is inoperable due to a malfunction, etc., the ECU switches to the first fallback mode.

In the first fallback mode, when a pedal effort is applied to the brake pedal 10 by a driver, the first master piston 1120 moves forward, and thus a pressing medium in the first master chamber 1121 is transmitted to the pedal simulator 1300 through the simulation passage 1310. The simulation piston 1320 is advanced by the pressing medium transmitted to the pedal simulator 1300, and thereby may compress the reaction force spring 1340. Accordingly, elastic restoring force of the reaction force spring 1340 is provided as a sense of pedaling to the driver. Since the simulation passage 1310 constantly remains open, a sense of pedaling by the pedal simulator 1300 may be identically provided to the driver in the first fallback mode. Meanwhile, since the cut valve 1821 is controlled in a closed state in the normal operation mode, the second master chamber 1131 is sealed.

The ECU operates the actuator 1700 located on a side of the first hydraulic circuit 1510 based on pedal displacement information of the brake pedal 10 sensed by the pedal displacement sensor 11. The ECU may also control an operation amount of the motor provided in the actuator 1700 based on the pedal displacement information. A driving force of the motor is transmitted to the caliper through the gear unit so that a brake pad is in contact with a disc to perform braking of the first and second wheel cylinders 21 and 22. In this instance, since the dump valve 1811 is open, the pressing medium applied to the first and second wheel cylinders 21 and 22 is discharged to the reservoir 1200 through the dump passage 1810. Accordingly, braking of the first and second wheel cylinders 21 and 22 by the actuator 1700 may be performed smoothly and delicately.

In addition, the ECU operates the hydraulic auxiliary device 1600 located on a side of the second hydraulic circuit 1520 based on the pedal displacement information of the brake pedal 10 sensed by the pedal displacement sensor 11. When it is identified a switch to the first fallback mode is required, the ECU operates the first isolation valve 1651 and the second isolation valve 1652 to be closed, and thereby hydraulically isolates the third and fourth wheel cylinders 23 and 24 from the hydraulic pressure supply device 1400. Afterwards, the ECU may control an operation of the motor 1610 of the hydraulic auxiliary device 1600 based on the pedal displacement information, and the pair of pumps 1620 may form hydraulic pressure of a pressing medium by the operation of the motor 1610. The pressing medium whose hydraulic pressure is formed by the pair of pumps 1620 may be transmitted to the third and fourth wheel cylinders 23 and 24 through the first and second auxiliary hydraulic passages 1631 and 1632, respectively. In this instance, the first and second support valves 1631a and 1632a provided in the first and second auxiliary hydraulic passages 1631 and 1632, respectively, operate in an open state.

Meanwhile, when braking is released in the first fallback mode, the first and second wheel cylinders 21 and 22 of the first hydraulic circuit 1510 control an operation direction of the motor of the actuator 1700, and thereby space apart the brake pad from the disc for releasing the braking. The third and fourth wheel cylinders 23 and 24 of the second hydraulic circuit 1520 open the first and second discharge valves 1641a and 1642a arranged on the first and second auxiliary dump passages 1641 and 1642, and thereby discharge the pressing medium applied to the third and fourth wheel cylinders 23 and 24 for releasing the braking.

Figure 4:
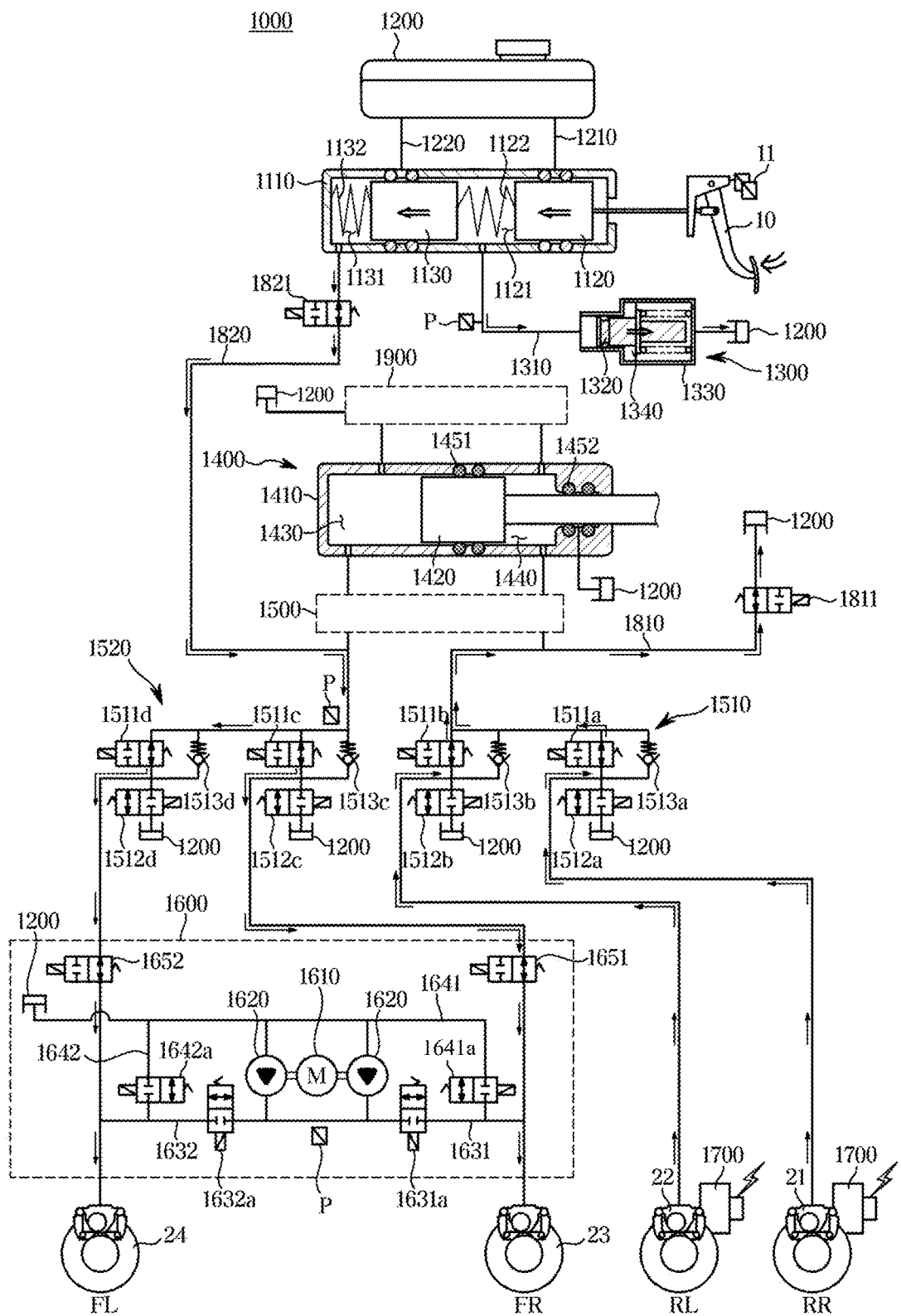
FIG. 4 is a hydraulic circuit diagram illustrating a state where a second fallback mode is implemented when a hydraulic pressure supply device and a hydraulic auxiliary device of an electronic brake system are suspended according to an embodiment of the disclosure.

According to an embodiment of the disclosure, the electronic brake system 1000 may switch to the second fallback mode shown in FIG. 4, when the hydraulic auxiliary device 1600 as well as the hydraulic pressure supply device 1400 are inoperable due to a malfunction, leakage of pressing medium, etc.

FIG. 4 is a hydraulic circuit diagram illustrating a state where a second fallback mode is implemented when the hydraulic pressure supply device 1400 and the hydraulic auxiliary device 1600 of the electronic brake system 1000 are suspended according to an embodiment of the disclosure. Referring to FIG. 4, the ECU switches to the second fallback mode when it is identified that the hydraulic auxiliary device 1600 and the hydraulic pressure supply device 1400 are inoperable due to a malfunction, etc.

In the second fallback mode, each valve is controlled in an inoperative state. In this instance, when a pedal effort is applied to the brake pedal 10 by a driver, the first master piston 1120 moves forward, and thus a pressing medium in the first master chamber 1121 is transmitted to the pedal simulator 1300 through the simulation passage 1310. The simulation piston 1320 is advanced by the pressing medium transmitted to the pedal simulator 1300, and thereby compresses the reaction force spring 1340. Accordingly, elastic restoring force of the reaction force spring 1340 is provided as a sense of pedaling to the driver. Since the simulation passage 1310 constantly remains open, a sense of pedaling by the pedal simulator 1300 may be identically provided to the driver in the second fallback mode.

Meanwhile, since the cut valve 1821 remains open in the second fallback mode, the second master piston 1130 is advanced by the hydraulic pressure of the pressing medium in the first master chamber 1121, and thus the pressing medium in the second master chamber 1131 is transmitted to the second hydraulic circuit 1520 through the backup passage 1820. In the second fallback mode, since the first and second isolation valves 1651 and 1652 remain open, the pressing medium supplied from the second master chamber 1131 is transmitted to the third and fourth wheel cylinders 23 and 24 to perform braking.

Braking of the first and second wheel cylinders 21 and 22 is performed by operating the pair of actuators 1700. Specifically, the ECU operates the actuator 1700 located on a side of the first hydraulic circuit 1510 based on the pedal displacement information of the brake pedal 10 sensed by the pedal displacement sensor 11 in the second fallback mode as well. The ECU may also control an operation amount of the motor provided in the actuator 1700 based on the pedal displacement information. A driving force of the motor is transmitted to the caliper through the gear unit so that the brake pad is in contact with the disc to perform braking of the first and second wheel cylinders 21 and 22. In this instance, since the dump valve 1811 is open, the pressing medium applied to the first and second wheel cylinders 21 and 22 is discharged to the reservoir 1200 through the dump passage 1810.

According to an embodiment of the disclosure, the electronic brake system 1000 can stably and effectively brake a vehicle even in various emergency situations such as an inoperability of various constituent components, etc. Also, customer reliability can be improved since the vehicle can be braked in any situation. Further, various fallback modes can be implemented with a simple configuration and device, and thereby can reduce the number of constituent components and manufacturing cost.

The invention claimed is:

1. An electronic brake system, comprising:
a reservoir configured to store a pressing medium;
a master cylinder connected to a brake pedal;
a pedal simulator connected to the master cylinder;
a hydraulic pressure supply device configured to generate hydraulic pressure by operating a hydraulic piston by an electrical signal output corresponding to a displacement of the brake pedal;
a hydraulic control unit comprising a first hydraulic circuit and a second hydraulic circuit, and configured to control hydraulic pressure transmitted to the first hydraulic circuit and the second hydraulic circuit, the first hydraulic circuit including a first wheel cylinder and a second wheel cylinder, the second hydraulic circuit including a third wheel cylinder and a fourth wheel cylinder;
a hydraulic auxiliary device provided in the second hydraulic circuit and configured to supply hydraulic pressure to the third wheel cylinder and the fourth wheel cylinder when the hydraulic pressure supply device is inoperable; and
a pair of actuators provided on a caliper of the first wheel cylinder and the second wheel cylinder, respectively, and configured to perform braking of each of the first wheel cylinder and the second wheel cylinder when the hydraulic pressure supply device is inoperable,
wherein the hydraulic auxiliary device comprises a pair of pumps configured to pressurize a pressing medium, a motor configured to drive the pair of pumps, a first auxiliary hydraulic passage configured to transmit a pressing medium pressurized by one of the pair of pumps to the third wheel cylinder, and a second auxiliary hydraulic passage configured to transmit a pressing medium pressurized by another of the pair of pumps to the fourth wheel cylinder,
wherein the first auxiliary hydraulic passage and the second auxiliary hydraulic passage are configured to communicate with each other by having a passage connecting a first node between the one of the pair of pumps and the third wheel cylinder and a second node between the another of the pair of pumps and the fourth wheel cylinder without any valve between the first node and second node.

2. The electronic brake system of claim 1, wherein the hydraulic auxiliary device further comprises a first support valve provided in the first auxiliary hydraulic passage and configured to control flow of a pressing medium, and a second support valve provided in the second auxiliary hydraulic passage and configured to control flow of a pressing medium.

3. The electronic brake system of claim 2, wherein the hydraulic auxiliary device further comprises a first auxiliary dump passage configured to discharge a pressing medium applied to the third wheel cylinder, and a second auxiliary dump passage configured to discharge a pressing medium applied to the fourth wheel cylinder.

4. The electronic brake system of claim 3, wherein the hydraulic auxiliary device further comprises a first discharge valve provided in the first auxiliary dump passage and configured to control flow of a pressing medium, and a second discharge valve provided in the second auxiliary dump passage and configured to control flow of a pressing medium.

5. The electronic brake system of claim 4, wherein the hydraulic auxiliary device further comprises a first isolation valve configured to allow and block a pressing medium transmitted from at least one of the master cylinder and the hydraulic pressure supply device to the third wheel cylinder, and a second isolation valve configured to allow and block a pressing medium transmitted from at least one of the master cylinder and the hydraulic pressure supply device to the fourth wheel cylinder.

6. The electronic brake system of claim 1, wherein the master cylinder comprises a first master piston connected to the brake pedal, a first master chamber whose volume is changed by a displacement of the first master piston, a second master piston provided to be displaceable by hydraulic pressure of the first master chamber, and a second master chamber whose volume is changed by a displacement of the first master piston.

7. The electronic brake system of claim 6, further comprising:
a simulation passage configured to constantly hydraulically connect the first master chamber and the pedal simulator.

8. The electronic brake system of claim 7, wherein the pedal simulator comprises a simulation piston provided to be displaceable by a pressing medium transmitted through the simulation passage, a simulation chamber whose volume is changed by a displacement of the simulation piston and configured to communicate with the reservoir, and a reaction force spring configured to elastically support the simulation piston.

9. The electronic brake system of claim 6, further comprising:
a dump passage configured to connect the first hydraulic circuit and the reservoir; and
a dump valve provided in the dump passage and configured to control flow of a pressing medium.

10. The electronic brake system of claim 9, further comprising:
a backup passage configured to connect the second master chamber and the second hydraulic circuit; and
a cut valve provided in the backup passage and configured to control flow of a pressing medium.

11. The electronic brake system of claim 6, further comprising:
   a reservoir passage configured to connect the reservoir and the master cylinder,
   wherein the reservoir passage comprises a first reservoir passage configured to communicate the reservoir with the first master chamber, and a second reservoir passage configured to communicate the reservoir with the second master chamber.

12. The electronic brake system of claim 1, wherein the first hydraulic circuit comprises a first inlet valve and a second inlet valve configured to control flow of a pressing medium supplied from the hydraulic pressure supply device to the first wheel cylinder and the second wheel cylinder, respectively, and a first outlet valve and a second outlet valve configured to control flow of a pressing medium discharged from the first wheel cylinder and the second wheel cylinder to the reservoir, respectively, and
   the second hydraulic circuit comprises a third inlet valve and a fourth inlet valve configured to control flow of a pressing medium supplied from the hydraulic pressure supply device to the third wheel cylinder and the fourth wheel cylinder, respectively, and a third outlet valve and a fourth outlet valve configured to control flow of a pressing medium discharged from the third wheel cylinder and the fourth wheel cylinder to the reservoir, respectively.

13. The electronic brake system of claim 6, wherein the master cylinder further comprises a first piston spring provided between the first master piston and the second master piston, and a second piston spring provided between a cylinder block and the second master piston.

14. The electronic brake system of claim 1, further comprising:
   a dump control unit configured to connect the hydraulic pressure supply device to the reservoir and control flow of a pressing medium.

15. The electronic brake system of claim 1, wherein the hydraulic auxiliary device is connected between a flow path connected to the third wheel cylinder of the second hydraulic circuit and another flow path connected to the fourth wheel cylinder of the second hydraulic circuit.

* * * * *